(12) United States Patent (10) Patent No.: US 12,625,966 B2
Noguchi (45) Date of Patent: May 12, 2026

(54) INFORMATION PROCESSING DEVICE, NETWORK DEVICE, AND METHOD FOR UPDATING NETWORK DEVICE FIRMWARE

(71) Applicant: Hitachi, Ltd., Tokyo (JP)

(72) Inventor: Takashi Noguchi, Tokyo (JP)

(73) Assignee: HITACHI VANTARA, LTD., Yokohama (JP)

(*) Notice: Subject to any disclaimer, the term of this patent is extended or adjusted under 35 U.S.C. 154(b) by 228 days.

(21) Appl. No.: 18/369,918

(22) Filed: Sep. 19, 2023

(65) Prior Publication Data

US 2024/0330467 A1     Oct. 3, 2024

(51) Int. Cl.
*G06F 9/44* (2018.01)
*G06F 21/57* (2013.01)

(52) U.S. Cl.
CPC .................................. *G06F 21/572* (2013.01)

(58) Field of Classification Search
CPC .................................................. G06F 21/572
See application file for complete search history.

(56) References Cited

U.S. PATENT DOCUMENTS

| | | | | |
|---|---|---|---|---|
| 11,157,265 B2 * | 10/2021 | Bulusu | .................... | G06F 8/654 |
| 2019/0042272 A1 * | 2/2019 | Kotary | ................. | G06F 9/4401 |
| 2019/0073478 A1 * | 3/2019 | Khessib | ................ | G06F 9/4401 |
| 2021/0365558 A1 * | 11/2021 | Samuel | .................... | G06F 8/654 |
| 2023/0195451 A1 * | 6/2023 | Shetty | .................... | G06F 8/654 |
| | | | | 717/178 |

FOREIGN PATENT DOCUMENTS

WO      2020122024 A1     6/2020

* cited by examiner

*Primary Examiner* — Qamrun Nahar
(74) *Attorney, Agent, or Firm* — MATTINGLY & MALUR, PC

(57) ABSTRACT

An information processing device includes a controller and an interface device. The controller stores a compressed file including new firmware for the interface device, and sends at least part of compressed data in the compressed file to the interface device. The interface device performs a signature verification process and a decompressing process on the received compressed data in parallel.

7 Claims, 14 Drawing Sheets

STORAGE CONTROLLER  10                                    SMART NIC  20

DRAM(DKC_CTL)  104

DMA

COMPRESSED DATA

COMPRESSED DATA

DRAM(SNIC)  204

SIGNATURE VERIFICATION

COMPRESSED DATA (WHOLE)

COMPRESSED DATA

COMPRESSED DATA

COMPRESSED DATA

DECOMPRESSING /WRITING

DATA WRITING

BUILT-IN MEMORY (SUB-REGION)  215

105

| CHB ID | FW UPDATE ACCEPTANCE STATE | FW BEING UPDATED | REGION SWITCHING STATE |
|--------|------------------------------|-------------------|------------------------|
| 1 | POSSIBLE | NO | IMPOSSIBLE |
| 2 | IMPOSSIBLE | YES | IMPOSSIBLE |
| 3 | IMPOSSIBLE | NO | POSSIBLE |

CHB FW UPDATE STATE CONTROL TABLE

| CHB ID | ACTIVATION STATE | FW Ver. | NW INFORMATION | | |
|--------|------------------|---------|----------------|---|---|
| | | | IP ADDRESS | PACKET SIZE | - |
| 1 | ACTIVE | 88058041-1 | 192.168.100.1 | MTU9000 | - |
| 2 | ACTIVE | 8805804-1 | 192.168.101.1 | MTU1500 | - |
| 3 | BLOCKED | - ※DUE TO BLOCKAGE | - | - | - |

CHB CONTROL TABLE

*FIG. 6*

| # | TRIGGER | SMART NIC | REMARKS |
|---|---------|-----------|---------|
| 1 | PS-ON | ○ | WHEN DKC IS ON |
| 2 | CHB EXPANSION | ○ | USER OPERATION |
| 3 | CHB REPLACEMENT | ○ | SAME AS ABOVE |
| 4 | ONLINE CHB FW UPDATE | ○ | SAME AS ABOVE |
| 5 | OFFLINE CHB FW UPDATE | ○ | SAME AS ABOVE |

FW UPDATE TRIGGER

FIG. 7

| # | UPDATE FW VER. VS. CHB FW VER. | FORCED IMPLEMENTATION MODE | FW UPDATE |
|---|-------------------------------|----------------------------|-----------|
| 1 | UPDATE FW Ver. = CHB FW Ver. | OFF | NOT IMPLEMENTED |
| 2 | | ON | NOT IMPLEMENTED |
| 3 | UPDATE FW Ver. < CHB FW Ver. | OFF | NOT IMPLEMENTED |
| 4 | | ON | IMPLEMENTED |
| 5 | UPDATE FW Ver. > CHB FW Ver. | OFF | IMPLEMENTED |
| 6 | | ON | IMPLEMENTED |

UPDATE IMPLEMENTATION STATE BY FW VERSION

| CHB ID | FW UPDATE ACCEPTANCE STATE | FW TRANSFER STATE | | | REGION SWITCHING ACCEPTANCE STATE | REGION SWITCHING IMPLEMENTATION | WAITING FOR RESET |
| | 252 | 253 | | | 254 | 255 | 256 |
| 251 | | SIGNATURE VERIFICATION IMPLEMENTATION STATE | DECOMPRESSING /WRITING STATE | NIC FW DECOMPRESSING STATE | | | |
| 1 | POSSIBLE | BLOCK 4: SIGNATURE VERIFICATION IS ONGOING | BLOCK 4: DECOMPRESSING /WRITING IS ONGOING | DONE | IMPOSSIBLE ※AS FW IS BEING TRANSFERRED | NOT IMPLEMENTED | IMPOSSIBLE ※AS FW IS BEING TRANSFERRED |

CHB FW UPDATE STATE CONTROL TABLE

| CHB IID | FW Ver. | UPDATE TIME |
|---------|---------|-------------|
| 1 | 88050088-1 | 20221108 |

FW VERSION CONTROL TABLE

*FIG. 10*

INFORMATION PROCESSING DEVICE, NETWORK DEVICE, AND METHOD FOR UPDATING NETWORK DEVICE FIRMWARE

CLAIM OF PRIORITY

The present application claims priority from Japanese patent application JP 2023-053868 filed on Mar. 29, 2023, the content of which is hereby incorporated by reference into this application.

BACKGROUND ART

The present invention relates to an information processing device, a network device, and a method for updating network device firmware.

Data storage is a basic function of a computer system. Many computer systems handling a large amount of data uses a storage system to store the data. The storage system stores data in a storage medium such as HDD (hard disk drive) or SSD (solid state drive), and performs data writing/reading operations in accordance with a command from outside.

The background art of the present disclosure is WO2020/122024. WO2020/122024 discloses a technology that can "reduce an effect of rewriting circuit information of a network interface card (NIC) including a programmable logic circuit on system availability. The NIC includes a programmable logic circuit for processing an inputted packet according to recorded circuit information; a pair of switches respectively provided at an input terminal and an output terminal of the programmable logic circuit, the switches being able to switch between a first mode sending a packet to the programmable logic circuit and a second mode bypassing the programmable logic circuit; a computer-side interface that sends the packet to a computer that can execute an application program capable of performing packet processing on behalf of the programmable logic circuit; and a switch control circuit that switches the pair of switches to the second mode when rewriting the circuit information of the programmable logic circuit." This technology requires switches and a control circuit for rewriting a program while continuously providing a service.

SUMMARY OF THE INVENTION

As the performance of an interface device (or a network device) of a storage system has improved, for example, the size of the software executed by the interface device has also been increasing. In some cases, a smart NIC provided with a processor that can perform high-load processes runs software for ASIC, in addition to OS and applications that work on the OS.

When the size of the software in the interface device is large, a large amount of resource may be required to update the software. In addition, in a storage system that is required to keep running all the time, it is necessary to update the software of the interface device without stopping IO, and thus, allocating a large amount of memory area to the update is not feasible. Therefore, software update for the interface device needs to be performed properly with the limited capacity.

An aspect of this disclosure is an information processing device, including: a controller; and an interface device, wherein the controller: stores a compressed file including new firmware for the interface device; and sends at least part of compressed data in the compressed file to the interface device, and wherein the interface device performs a signature verification process and a decompressing process on the received compressed data in parallel.

An aspect of this disclosure is a network device, including: a processor; a first memory; and a second memory, wherein the processor: receives, from another device, compressed data including at least part of a new firmware for the network device and stores the data in the first memory; and performs a signature verification process and a decompressing process on the compressed data in parallel, and stores decompressed data in the second memory.

According to one embodiment of this disclosure, it is possible to effectively perform software update for a network device.

BRIEF DESCRIPTION OF THE DRAWINGS

FIG. 5 shows a configuration example of a CHB FW update state control table stored in the storage controller.

FIG. 6 shows a configuration example of a CHB control table stored in the storage controller.

FIG. 7 illustrates triggers for updating the CHB firmware.

FIG. 8 illustrates criteria for updating CHB firmware.

FIG. 9 shows a configuration example of a CHB FW update state control table.

FIG. 10 shows a configuration example of a FW version control table.

DETAILED DESCRIPTION OF EMBODIMENTS

Figure 1:
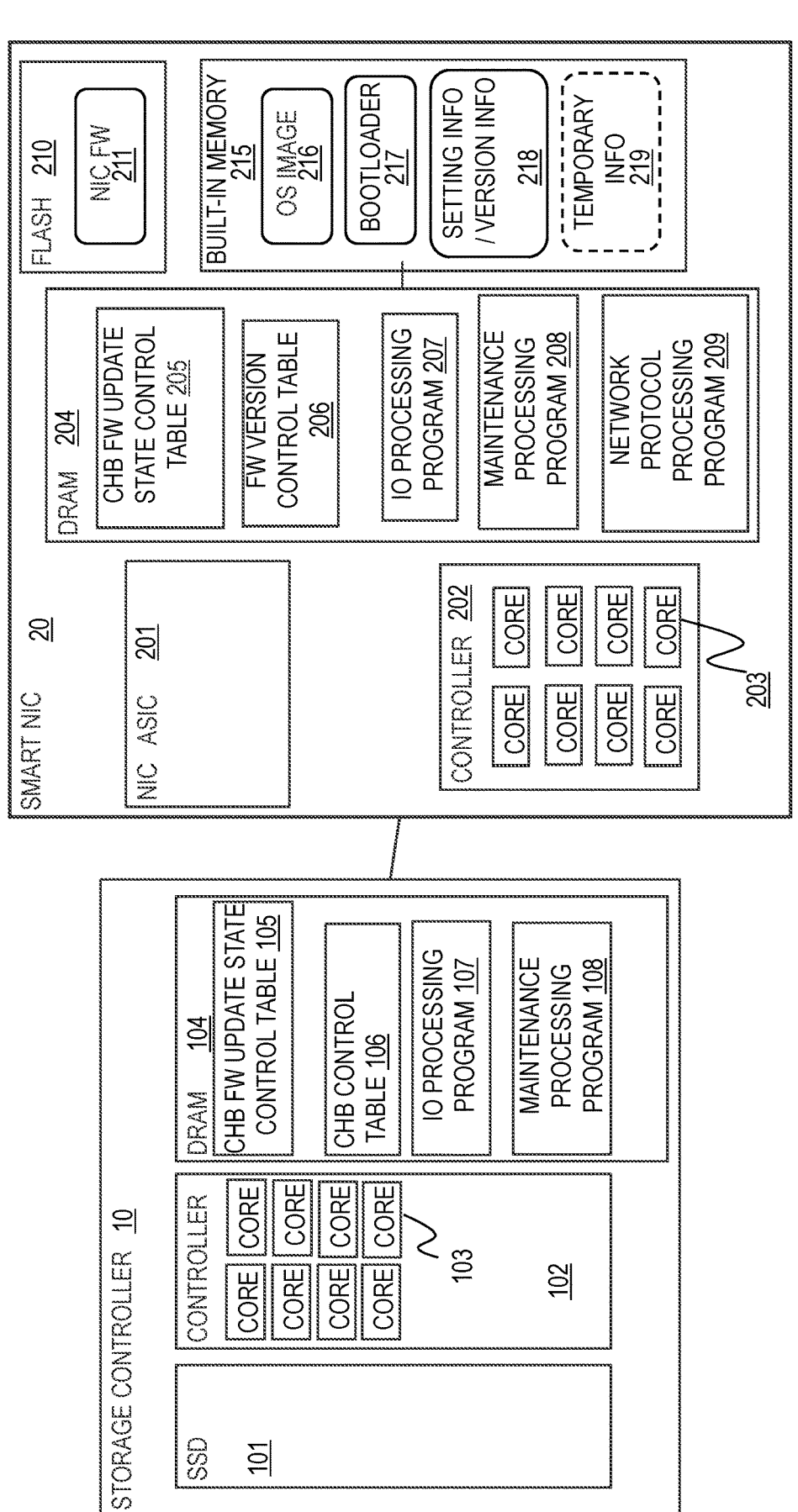
FIG. 1 shows a configuration example of a storage controller and a smart NIC according to one embodiment of the present specification.

Below, embodiments of the present invention will be explained in detail with reference to the figures. In the descriptions below, the same reference characters will be given to the same configurations, and the same description will not be repeated. The embodiments are merely examples to achieve the present invention, and shall not limit the technical scope of the present invention.

FIG. 1 shows a configuration example of a storage controller 10 and a smart NIC (network interface card) 20 according to one embodiment of the present specification. The storage controller 10 and the smart NIC 20 are installed in a storage system, which is an example of an information processing device. The smart NIC 20 is an example of an interface device or a network device, and included in a channel board (CHB). In the example explained below, the smart NIC is a communication interface between the host and the storage controller 10. The smart NIC of an embodiment of the present invention may also be used for an interface device between storage devices or between storage controllers.

The storage controller 10 includes an SSD (Solid State Drive) 101 that is a non-volatile memory, a controller 102, and a DRAM 104 that is volatile memory. The controller 102 includes a plurality of processor cores 103. The processor core 103 is a processor and may be implemented with a plurality of CPUs each including one or more processor cores.

The DRAM 104 has stored therein programs executed by the controller 102 and data referred to by the controller 102. Specifically, an NIC FW update state control table 105 and CHB control table 106 are stored in the DRAM 104. FW refers to firmware. Furthermore, an IO processing program 107 and maintenance processing program 108 are stored in the DRAM 104. Data stored in the DRAM 104 is loaded from the SSD 101, for example. The controller 102 conducts operations in accordance with the programs, acting as a prescribed function unit.

The IO processing program 107 conducts operations in accordance with IO request received from the host device. The maintenance processing program 108 transmits maintenance commands (commands that can be operated by user via GUI) to the smart NIC 20, and performs network settings for communication with the host device, firmware updates, and the like. Firmware updates involve replacing part or all of the existing firmware.

The smart NIC 20 includes NIC ASIC 201, a controller 202, a DRAM 204, a flash memory 210 and a built-in memory 215, which is a non-volatile memory card. The controller 202 includes a plurality of processor cores 203. The processor core 203 is a processor and may be implemented with a plurality of CPUs each including one or more processor cores.

The DRAM 204 has stored therein programs executed by the controller 202 and data referred to by the controller 202. Specifically, the DRAM 204 stores a smart NIC FW update status control table 205, FW version control table 206, IO processing program 207, maintenance processing program 208, and network protocol processing program 209. The DRAM 204 also has stored therein OS, which is not shown in the figure.

The network protocol processing program 209 converts a communication protocol within the host device to a communication protocol within the storage system and vice-verse. The IO processing program 207 generates commands for communicating with the storage controller 10 in response to requests received from the host device, and performs a data transfer process to the host device or the storage controller 10.

The maintenance processing program 208 reflects setting values in the smart NIC 20 based on the maintenance command information provided by the storage controller 10, and also executes firmware update.

The flash memory 210 has stored therein firmware (NIC FW) of the NIC ASIC 201. The built-in memory 215 has stored therein OS image 216, bootloader 217, and setting information/version information 218. The built-in memory 215 also temporarily saves temporary information 219 in the smart NIC firmware update. Although not shown in the figure, the built-in memory 215 also has stored therein a controller that stores the temporary information 219. The operation of this controller will be described later in detail.

The OS image 216 includes OS executed by the controller 202 as well as the programs 207 to 209. The bootloader 217 is a boot program for the OS. The setting information/version information 218 also includes the tables 205 and 206 and other control information stored in the DRAM 204.

Figure 2:
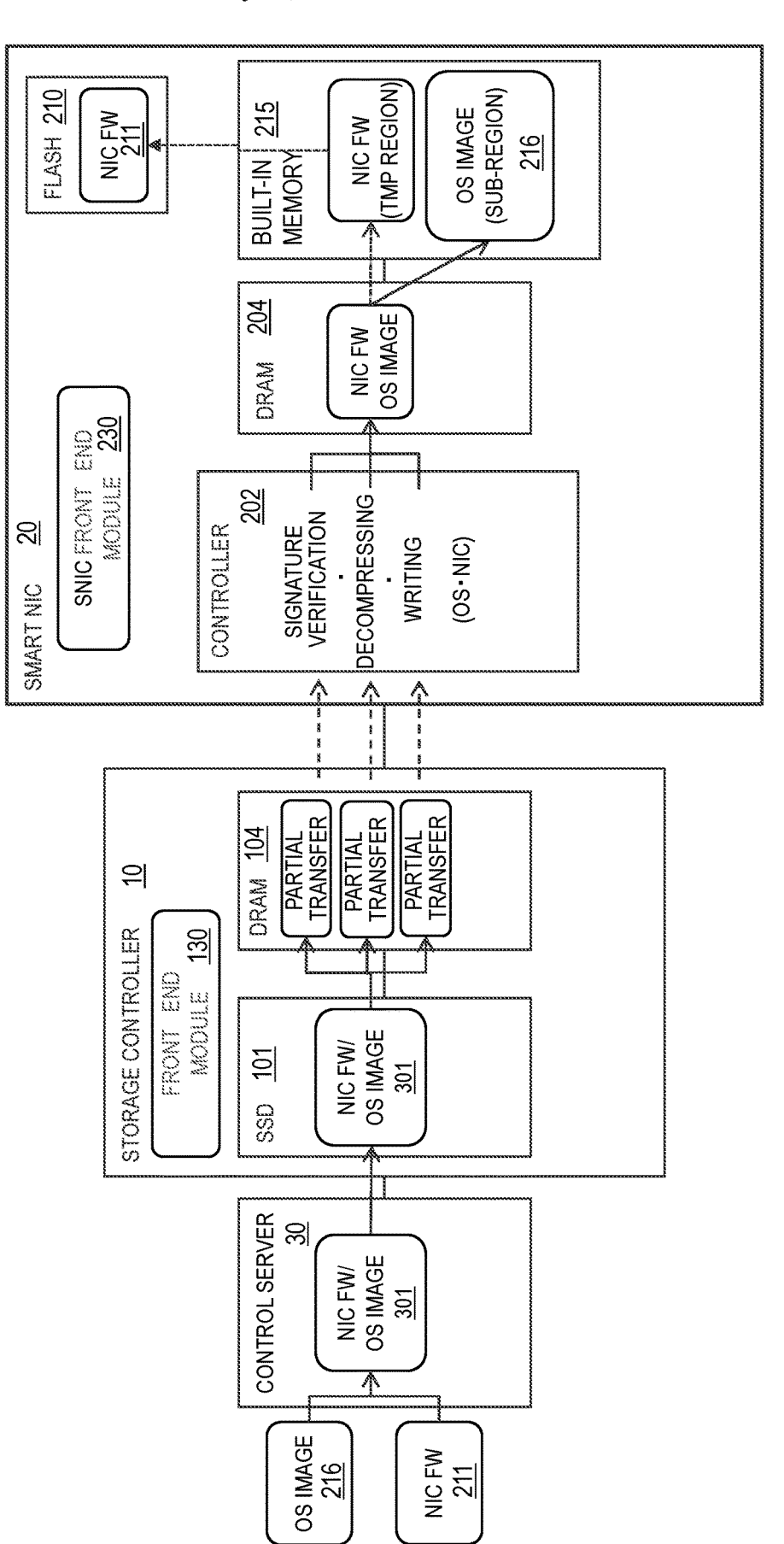
FIG. 2 is an operation concept diagram schematically illustrating how smart NIC firmware is updated according to one embodiment of the present specification.

FIG. 2 is an operation concept diagram schematically illustrating how smart NIC firmware is updated according to one embodiment of the present specification. Explained below is an example where old firmware is entirely replaced with new firmware. The firmware update for the smart NIC 20 described in this embodiment is applicable to an information processing device differing from a storage system, such as a smart NIC 20 implemented in a server. It is also applicable to an interface device or a communication processing device instead of a smart NIC.

The control server 30 creates a smart NIC FW from the new OS image 216 and NIC FW 211, and generates compressed data 301 (also called a compressed file) thereof. A signature is assigned to the compressed data 301. The OS image 216 also includes the bootloader 217, which is a boot program. The storage controller 10 receives the compressed data 301 of the smart NIC FW and header information thereof from the control server 30 via a control network (not shown) and stores it in the SSD 101. Because the data is compressed, it requires a smaller storage area in the storage controller 10.

Figure 3:
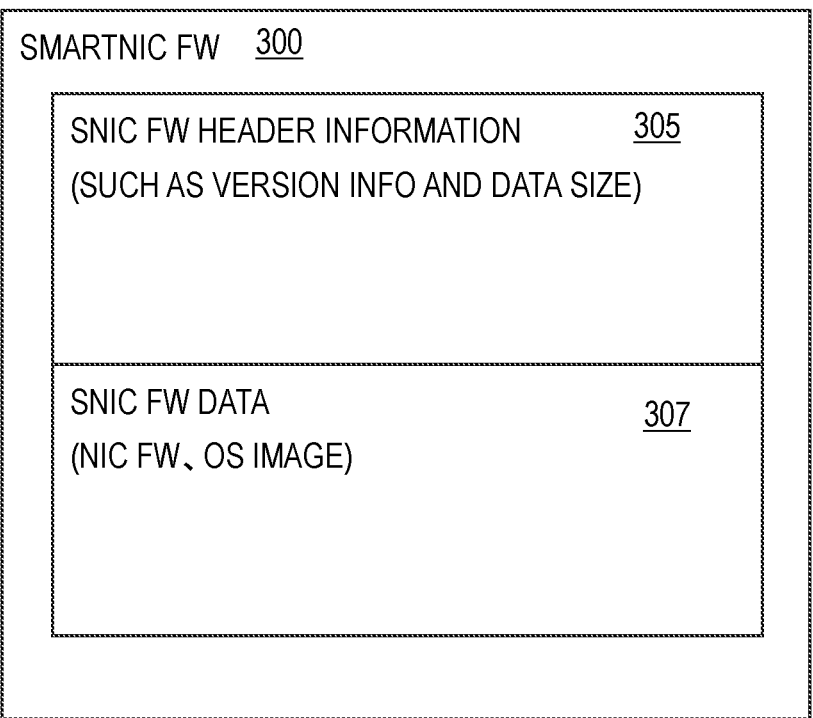
FIG. 3 illustrates an example of data included in the smart NIC firmware.

FIG. 3 illustrates an example of data included in smart NIC FW 300. The smart NIC FW includes SNIC FW header information 305, and SNIC FW data 307. The SNIC FW header information 305 includes information about the SNIC FW data 307, such as version information of the SNIC FW data 307, generated date and time information, data size of the compressed SNIC FW data 307, signature method, OS image 216 and signature of NIC FW 211.

The SNIC FW data 307 includes NIC FW 211 and OS image 216. As described above, the OS image 216 also includes the bootloader 217. The compressed data 301 written from the control server 30 to the SSD 101 of the storage controller 10 includes compressed SNIC FW data 307 and uncompressed SNIC FW header information 305.

Returning to FIG. 2, a front-end module 130 of the storage controller 10 includes an IO processing program 107 and a maintenance processing program 108. The front-end module 130 stores the compressed data 301 of the smart NIC FW in the SSD 101. The front-end module 130 divides the compressed data into a plurality of blocks, and transfers those blocks to the smart NIC 20 via the DRAM 104 sequentially from the first block. Transferring the compressed data in blocks reduces the number of transfers. The DRAM 104 temporarily stores not all the blocks at the same time, but only one or several blocks at a time. For example, each block is read from the SSD to the DRAM 104, which transfers the block without storing a plurality of blocks at the same time. Alternatively, the compressed data may be divided within the DRAM 104.

The front-end module 230 of the smart NIC 20 includes an IO processing program 207 and a maintenance processing program 208. The controller 202 controls the front-end module 230 to perform, in parallel, signature verification process, decompression process, and writing process to the built-in memory 215 for each block that has been divided and transferred. As illustrated in FIG. 1, the controller 202 includes a plurality of cores 203. Those respective cores perform signature verification, decompressing and writing in parallel on respective blocks. This improves the processing speed. For example, when the writing process to the built-in memory 215 is completed for one block, the next block is stored in the DRAM 204. The operations of the front-end module 230 of the smart NIC 20 described below are also conducted by the controller 202.

The front-end module 130 of the storage controller 10 passes information regarding the overall size of the compressed data to the smart NIC 20 before starting transfer of partial blocks of compressed data. Also, upon transferring each block, the front-end module 130 passes information regarding the location of a particular transferred block in the entire compressed data and the size of the transferred block.

The front-end module 230 of the smart NIC 20 performs part of the signature verification process, block decompressing process, and writing process to the built-in memory 215 that can be performed on each block. When the signature verification is completed for the last block, the signature verification on the entire compressed data is deemed completed based on the signature verification result of each block. The decompressed blocks are integrated into OS image or NIC firmware, depending on the associated addresses.

As described above, by dividing the compressed data 301, a smaller area of the DRAM in the storage controller 10 and in the smart NIC 20 is required for firmware update, which means that the host data cache area of the storage controller 10 and the host data buffer area of the CHB are not reduced. The signature verification process, decompressing process, and writing process may be performed on the entire compressed data 301 without dividing it. Signature verification and decompression of divided blocks can be done through known techniques.

The signature verification process for the entire compressed data 301 is constituted of partial processing on respective blocks. The controller 202 can complete the signature verification process for the entire compressed data 301 by performing the signature verification process on all blocks in sequence from the first block.

The controller 202 writes decompressed blocks to the storage area of the built-in memory 215 via the DRAM 204. The NIC FW 211 is stored in the temporary storage area of the built-in memory 215 first, and then stored in the flash memory 210. Decompressed portions of the OS image 216 are sequentially stored in the storage area of the built-in memory 215 via the DRAM 204.

The flash memory 210 has two logic partitions (storage areas), which are a main region and a sub-region. New NIC FW 211 is stored in the sub-region of the flash memory 210. The old NIC FW 211 before update is stored in the main region of the flash memory 210. The storage area of the built-in memory 215 also has two logic partitions, which are a main region and a sub-region. New OS image 216 is stored in the sub-region of the built-in memory 215.

The old OS image 216 before update is stored in the main region of the flash memory 210. As described below, after the new firmware is normally stored in the sub-region, the main region and the sub-region are switched. With this switching, the firmware to be used is read from the sub-region (pre-switching), instead of the main region (pre-switching). When firmware is loaded again, the firmware is activated in the main region (post-switching). Because data is written to the sub-region, instead of the currently active region, the service to the host (access from the host) can continuously be provided.

Figure 4:
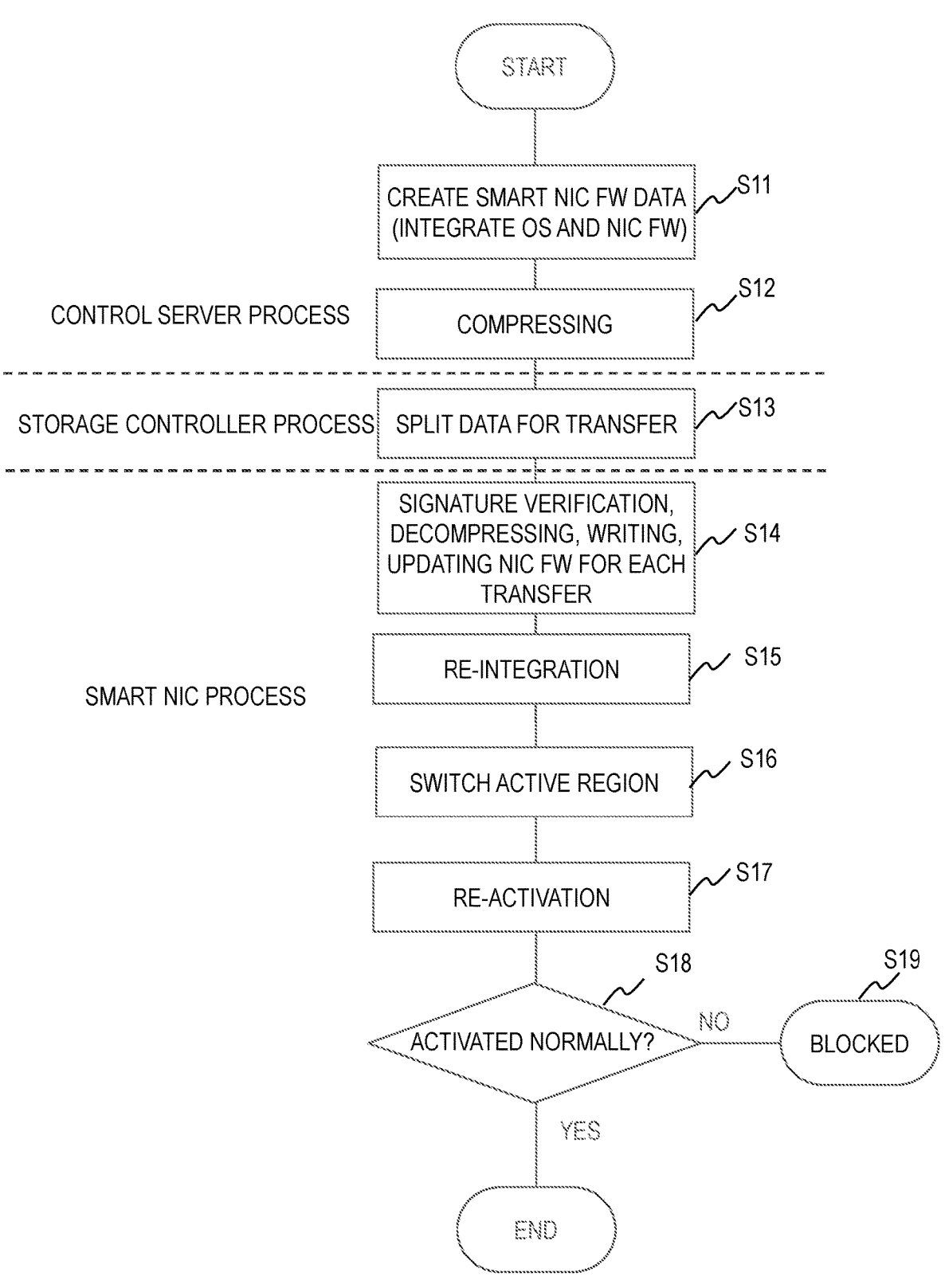
FIG. 4 is a flowchart of the entire process of updating the smart NIC firmware according to one embodiment of the present specification.

FIG. 4 is a flowchart of the entire process of updating firmware with the smart NIC 20 according to one embodiment of the present specification. First, the control server 30 combines OS image and NIC FW and generates smart NIC FW data 307 (S11). The control server 30 then compresses the smart NIC FW data 307 to generate compressed data 301 including smart NIC FW header information 305 (S12). A signature is assigned to the compressed data 301, which improves safety and reliability.

The controller 102 of the storage controller 10 receives the compressed data 301 from the control server 30, and stores the data in the SSD 101. The controller 102 divides the compressed data 301, and transfers the divided portions of data to the smart NIC 20 via the DRAM 104 in sequence (S13).

The front-end module 230 (controller 202) of the smart NIC 20 performs signature verification, decompression, and writing to the storage area of the built-in memory 215 on each piece of transferred data (each partial block), and writes the NIC FW to the flash memory 210 (NIC FW update) (S14).

Next, the front-end module 230 re-combines multiple decompressed blocks (portions) of the new OS image 216 stored in the storage area of the built-in memory 215 and multiple decompressed blocks (portions) of the new NIC FW 211 stored in the flash memory 210 based on the associated addresses (S15).

Next, the front-end module 230 switches the active region from the main region to the sub-region in each of the built-in memory 215 and the flash memory 210 (S16). Furthermore, the front-end module 230 restarts the smart NIC 20 (S17). This way, the new firmware stored in the new main region is activated. If the restart was not executed normally (S18: NO), then the smart NIC 20 is blocked (S19). If restarted normally (S18: YES), then the smart NIC 20 resumes processing with the new firmware.

Next, information held by the storage controller 10 and the smart NIC 20 will be explained. FIG. 5 shows a configuration example of the CHB FW update state control table 105 stored in the storage controller 10. The CHB FW update state control table 105 controls the state of the firmware update process of CHB. In this example, the number of smart NICs implemented in each CHB is one, and the information about the CHB firmware update process means the information about the smart NIC update process.

The CHB FW update state control table 105 includes a CHB ID column 151, a firmware update acceptance state column 152, a firmware updating column 153, and a switching state column 154. The storage controller 10 updates the CHB FW update state control table 105 as needed according to the response from the smart NIC 20.

The CHB ID column 151 indicates the CHB identifier (ID), which can be regarded as the ID of the smart NIC. The firmware update acceptance state column 152 indicates whether the CHB can accept firmware update processing. The firmware updating column 153 indicates whether the CHB is in the process of updating the firmware. The region switching state column 154 indicates whether the CHB is capable of executing a region switching process.

FIG. 6 shows a configuration example of the CHB control table 106 stored in the storage controller 10. The CHB control table 106 includes the firmware version and other attributes of CHB.

In the example of FIG. 6, the CHB control table 106 includes a CHB ID column 161, an activation state column 162, a firmware version column 163, and network information column 164. The storage controller 10 controls and updates the CHB control table 106.

The activation state column 162 indicates whether the CHB is activated normally or not. The activation state column 162 is updated as needed based on a response from the smart NIC 20. The firmware version column 163 indicates a version of the firmware in the CHB stored by the storage controller. The network information column 164 indicates communication-related information of each CHB, such as IP address and data transfer packet size.

FIGS. 7 and 8 are diagrams for explaining other types of information stored by the storage controller 10 in advance. FIG. 7 illustrates triggers for updating the CHB firmware. With the triggers illustrated in FIG. 7, the storage controller 10 starts the sequence of FIG. 11, performing the necessary firmware update for CHB.

FIG. 8 illustrates criteria for updating CHB firmware. Whether the firmware needs to be updated or not is determined based on a relationship between the version of new firmware stored by the storage controller 10 and the current CHB firmware version, and the setting of the forced implementation mode. Alternatively, the decision may be made based on just the relationship between the respective firmware versions, or other criteria may be used.

In the example shown in FIG. 8, when the version of the new firmware is the same as the version of the current CHB firmware, no firmware update is performed regardless of the status of the forced implementation mode. When the version of the new firmware is smaller (older) than the version of the current CHB firmware, firmware update is performed if the forced implementation mode is ON, and firmware update is not performed if the forced implementation mode is OFF. When the version of the new firmware is greater (newer) than the version of the current CHB firmware, firmware update is performed regardless of the status of the forced implementation mode.

FIGS. 9 and FIG. 10 shows an example of the control information stored in the smart NIC 20. FIG. 9 shows a configuration example of the CHB FW update state control table 205. The CHB FW update state control table 205 controls the state of CHB in the firmware update process. The CHB FW update state control table 205 is updated by the controller 202 as necessary.

In the example illustrated in FIG. 9, the CHB FW update state control table 205 includes a CHB ID column 251, transfer acceptance state column 252, a firmware transfer status column 253, a region switching acceptance state column 254, a region switching status column 255, and a waiting-for-reset column 256.

The firmware update acceptance state column 252 indicates whether the smart NIC 20 can accept firmware update. The firmware transfer state column 253 indicate the current state of the firmware update process. In the example illustrated in FIG. 9, the signature verification implementation state column indicates a block on which the signature verification is being performed. The decompressing/writing state column indicates a block on which the decompressing/writing process is being performed. The NIC FW decompressing state column indicates whether NIC FW has been decompressed or not.

The region switching acceptance state column 254 indicates whether the smart NIC 20 is capable of accepting the region switching. The region switching is a process to switch between the main region and the sub-region of the built-in memory 215 and the flash memory 210. The region switching state column 255 represents the region switching state, indicating whether the region switching has been completed or is being performed. The waiting-for-reset column 256 indicates whether the smart NIC 20 is capable of performing the reset process or not.

FIG. 10 shows a configuration example of the FW version control table 206. The FW version control table 206 manages the current version of the firmware of the smart NIC 20. In the example illustrated in FIG. 10, the FW version control table 206 includes a CHB ID column 261, a firmware version column 262, and an update time column 263. The firmware version column 262 indicates the current version of the firmware of the smart NIC 20, and the update time column 263 indicates the time (including date) at which the firmware was last updated.

Figure 11:
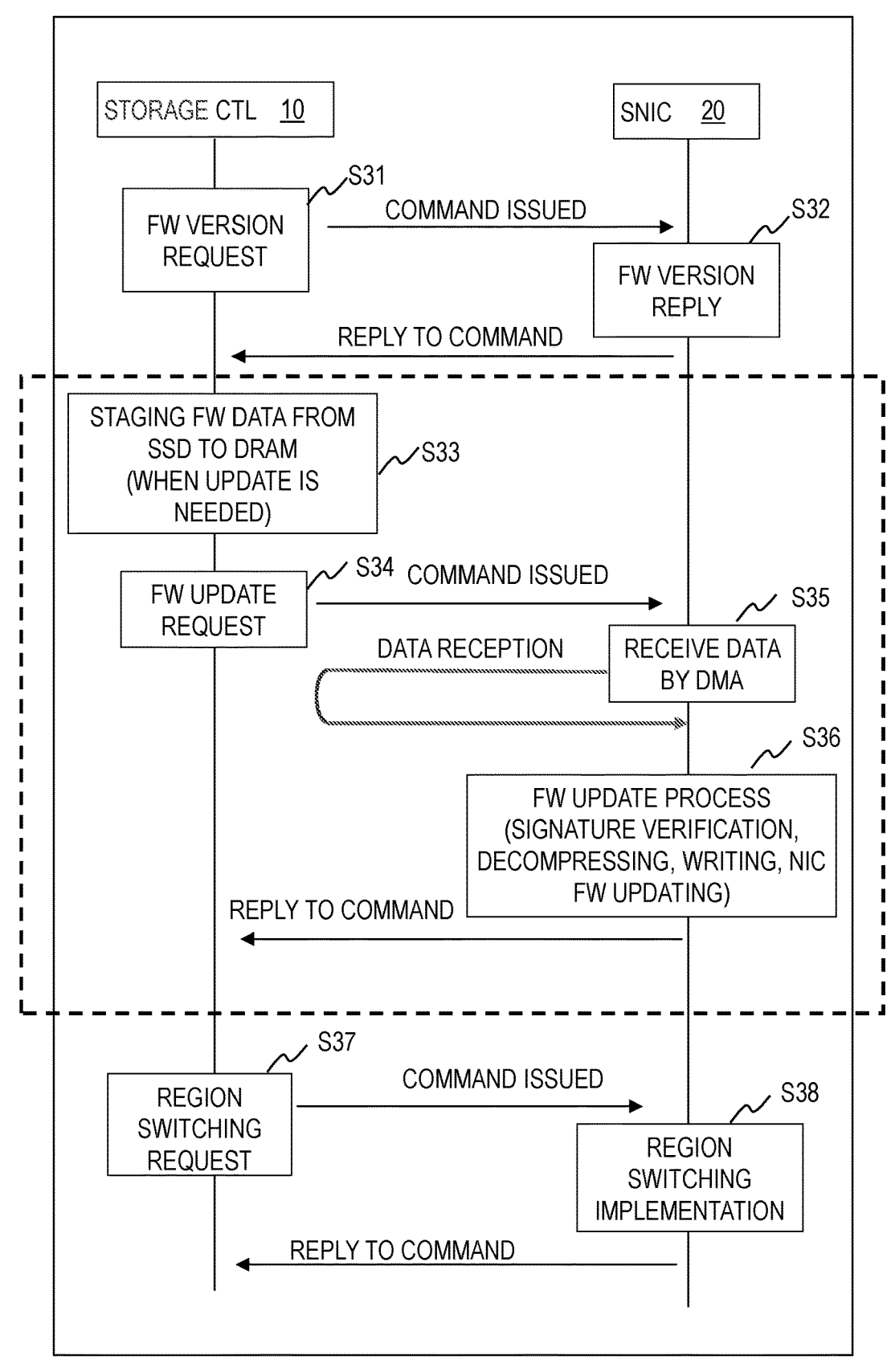
FIG. 11 is a sequence diagram illustrating the entire process of updating the smart NIC firmware according to one embodiment of the present specification.

FIG. 11 is a sequence diagram for the entire process of updating the smart NIC firmware according to one embodiment of the present specification. The storage controller 10 requests a version of the current smart NIC firmware from the smart NIC 20 (S31). The storage controller 10 may start the firmware updating process when triggered by any of the events explained with reference to FIG. 7. The storage controller 10 determines whether the firmware update is to be started or not based on the CHB FW update state control table 105.

The controller 202 of the smart NIC 20 returns the firmware version information to the storage controller 10 (S32). Firmware version information is stored in the FW version control table 206. The storage controller 10 compares the received current firmware version of the smart NIC 20 with the firmware version indicated by the CHB control table 106 to determine whether the firmware of the smart NIC 20 needs to be updated or not. Whether the update is necessary or not can be determined based on the information described with reference to FIG. 8.

If firmware update is required, the storage controller 10 and smart NIC 20 perform steps S33 to S36 for each block of compressed data.

The storage controller 10 stages the compressed blocks of the new firmware data from the SSD 101 to the DRAM 104 (S33), and transmits a FW update request to the smart NIC 20 (S34). The smart NIC 20 receives the blocks by DMA (S35) and performs signature verification, decompression and writing in parallel as described with reference to FIG. 2. The NIC firmware is temporarily stored in the built-in memory 215 and then written to the flash memory 210 (S36). The controller 202 of the smart NIC 20 returns a response to the storage controller 10 when block processing is completed.

When the above processing is completed on all blocks, the storage controller 10 transmits a region switching request to the smart NIC 20 (S37). Whether or not a request can be made or not is determined based on the CHB FW update status control table 105. The controller 202 of the smart NIC 20 executes region switching in response to the request (S38), and returns a response to the storage controller 10.

Figure 12:
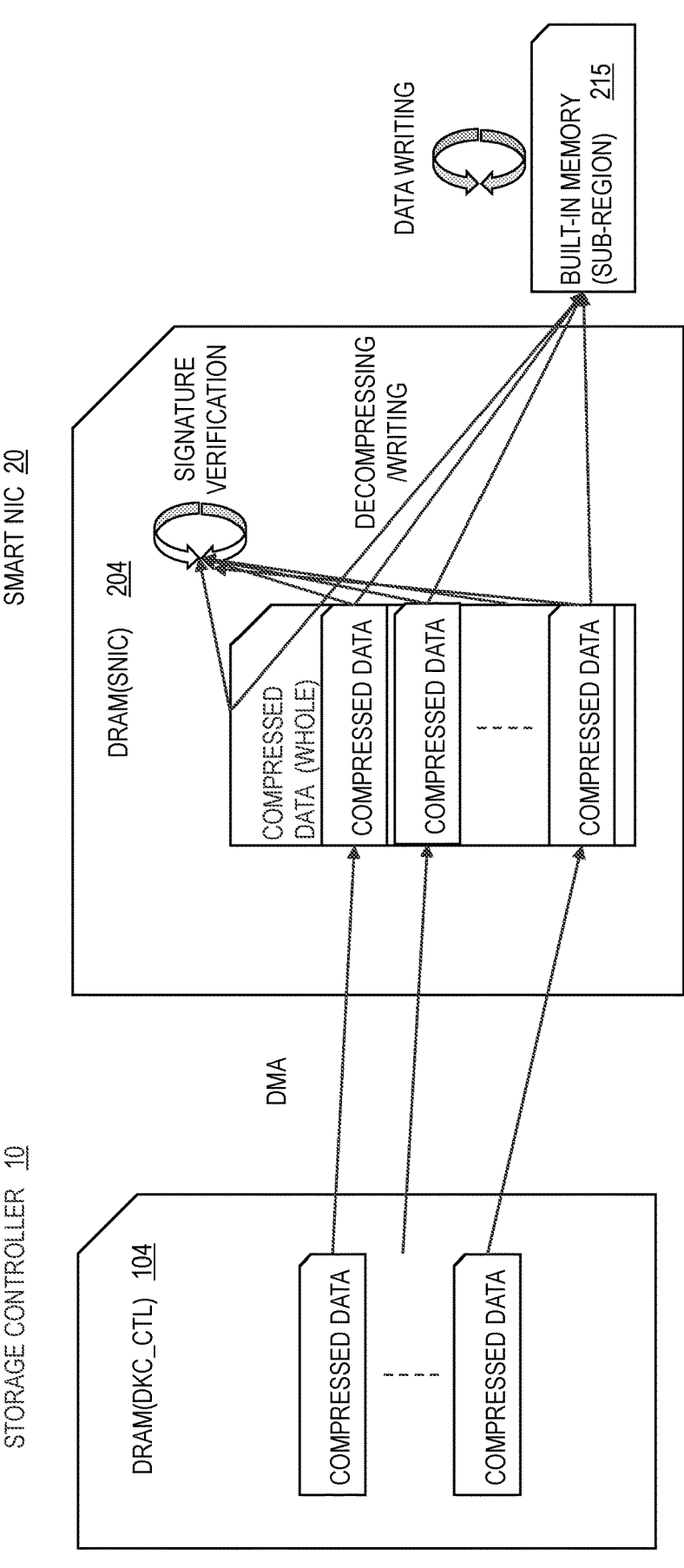
FIG. 12 is a concept diagram illustrating the firmware updating process by the smart NIC.

Below, the flow of the firmware updating process by the smart NIC 20 will be explained more specifically. FIG. 12 is a concept diagram illustrating the firmware updating process in the smart NIC 20.

Partial blocks of compressed data including the NIC firmware 211 and OS image 216 are sequentially transferred to the DRAM 204 of the smart NIC from the DRAM 104 of the storage controller by DMA. The smart NIC 20 performs signature verification and decompression/writing on each of the compressed data block. The signature verification and the decompression/writing are performed in parallel by respective cores 203. For example, after the writing process is completed on one block, the next block is transferred.

After all of the blocks have undergone the process, the smart NIC 20 determines whether the process was successful or not. The process is deemed successful only when both signature verification and decompression (writing) were normally completed. Although the process would not be completed for the entire compressed data until all of the blocks have been handled, it is possible to reduce the required memory area by performing necessary processes on each block.

Figure 13:
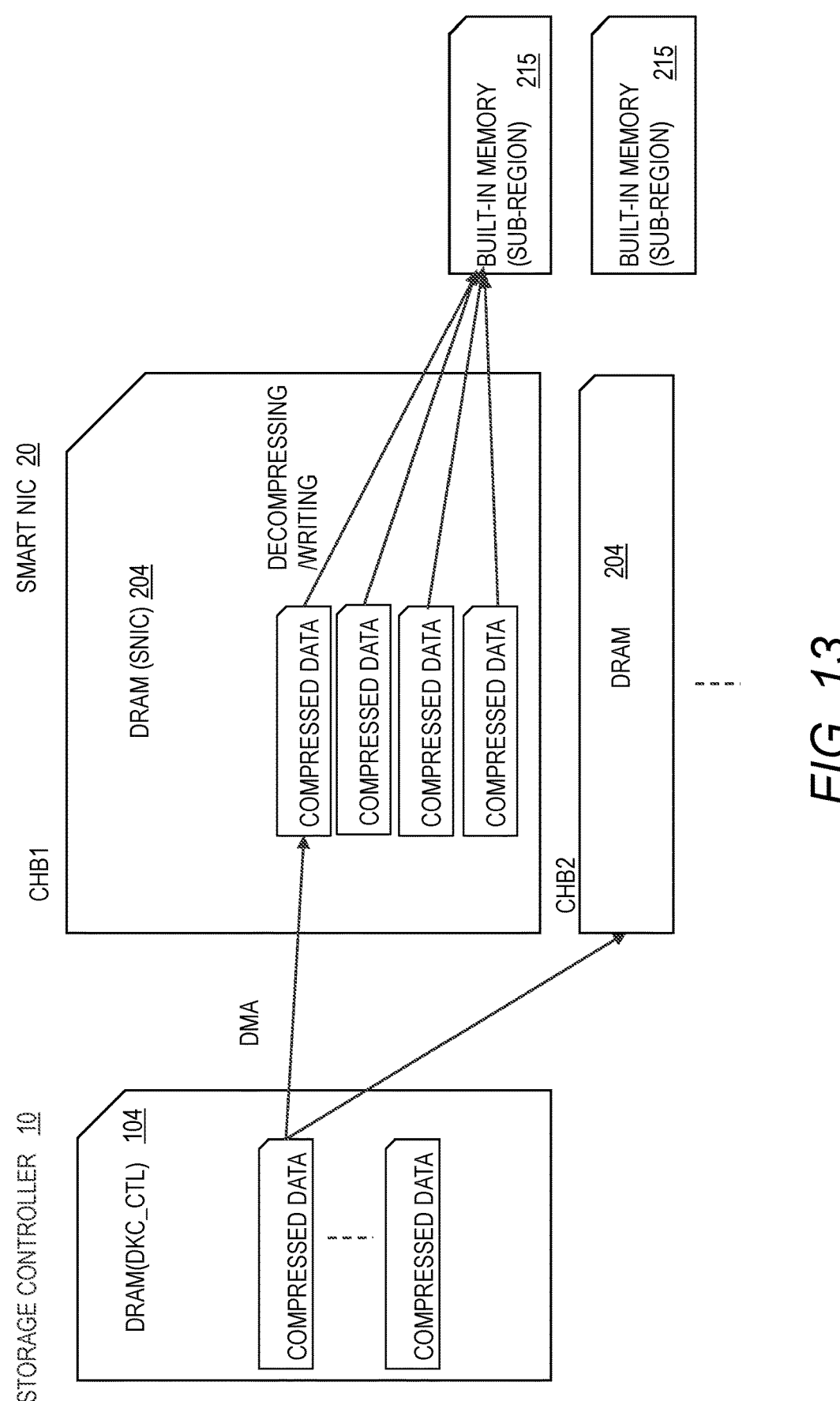
FIG. 13 is a concept diagram illustrating the firmware updating process by the smart NIC in a configuration including a plurality of CHB.

FIG. 13 is a concept diagram for illustrating the firmware updating process in the smart NIC 20 in a configuration including a plurality of CHBs. The storage controller 10 transfers common blocks in parallel to all CHBs performing firmware updates under its control. This allows for efficient firmware update. Each CHB operates as described with reference to FIG. 12.

Figure 14:
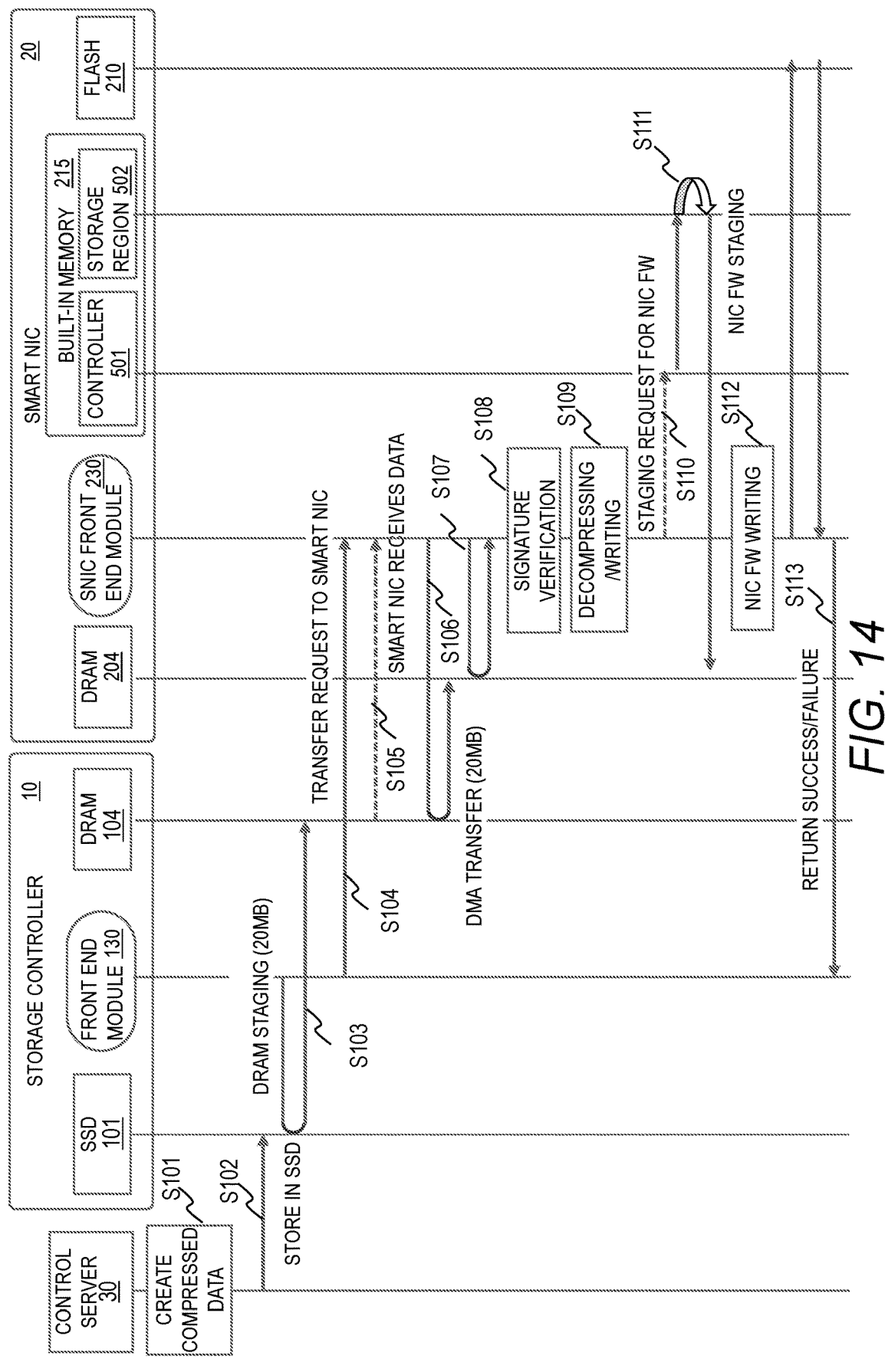
FIG. 14 is a sequence diagram of the initial part of the smart NIC firmware updating process.

Below, the flow of the firmware updating process in the smart NIC 20 will be explained with reference to a plurality of sequence diagrams. FIG. 14 is a sequence diagram of the initial part of the firmware updating process in the smart NIC 20. In the portion shown in FIG. 14, transmission of the new firmware from the control server 30 to the storage controller 10 and signature verification and decompression of a part of the NIC firmware 211 are performed.

First, the control server 30 creates compressed data of the firmware of the smart NIC 20 (S101) and stores it in the SSD 101 of the storage controller 10 (S102). The front-end module 130 of the storage controller 10 stages blocks that are part of the compressed data of the SSD 101 to the DRAM 104 (S103). Here, it is assumed that all the compressed data of the NIC firmware 211 is entirely stored in one block. The front-end module 130 requests the smart NIC 20 to transfer the blocks stored in the DRAM 104 (S104).

The front-end module 230 (controller 202) of the smart NIC 20 uses DMA transfer to move the block stored in the DRAM 104 of the storage controller 10 to the DRAM 204 (S105, S106).

The front-end module 230 reads out the blocks from the DRAM 204 (S107), and performs signature verification (S108) and decompression/writing (S109) on those blocks in parallel. The front-end module 230 requests staging of the decompressed NIC firmware 211 (block) from a controller of the built-in memory 215 (S110). The controller 501 temporarily stores the decompressed NIC firmware 211 in a storage area 502 of the built-in memory 215 (S111)

Thereafter, the front-end module 230 writes the NIC firmware 211 stored in the storage area 502 to the sub-region of the flash memory 210 (S112). Furthermore, the front-end module 230 notifies the storage controller 10 of a success/ failure of the process of the NIC firmware 211.

Figure 15:
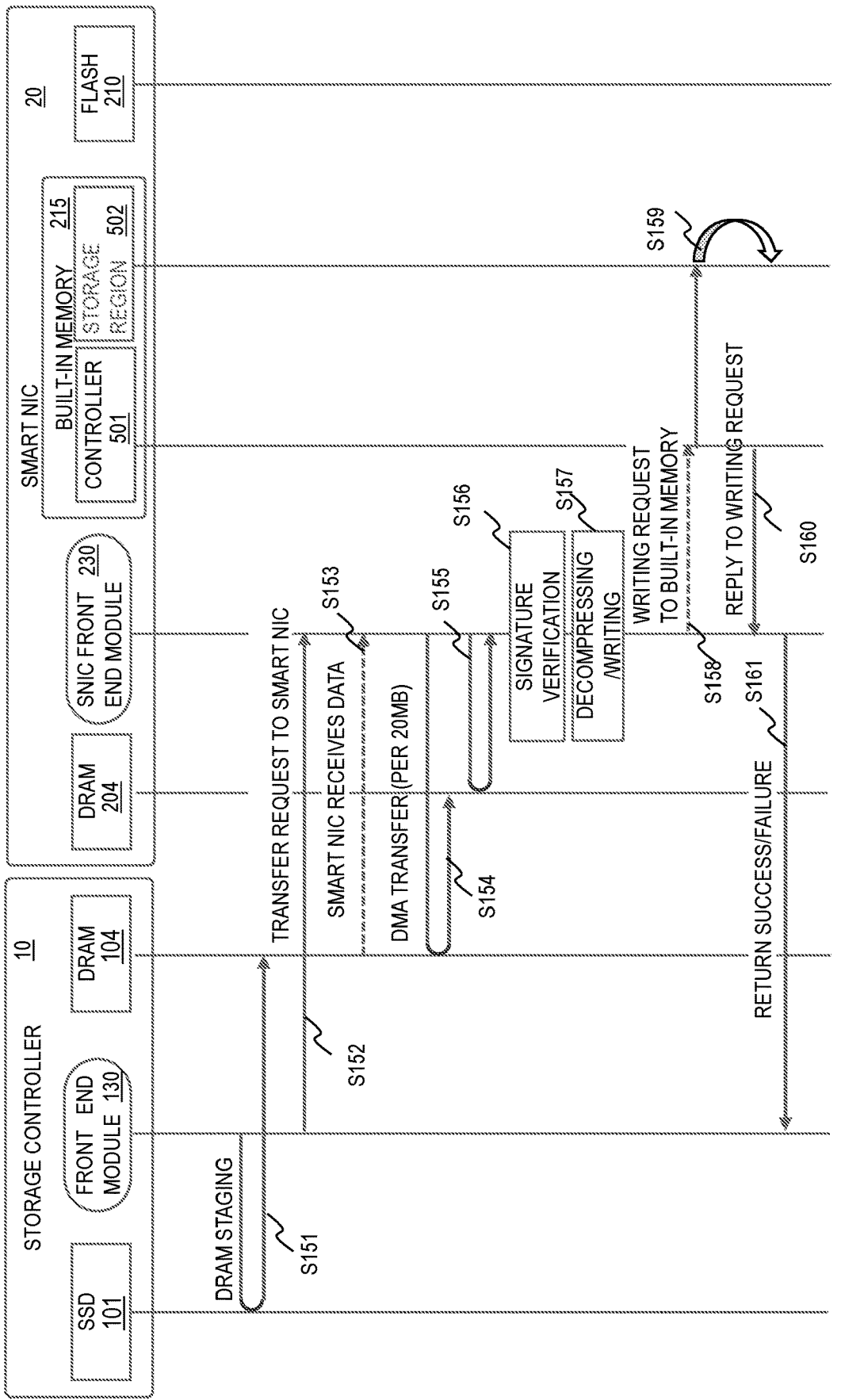
FIG. 15 is a sequence diagram of a process for one block of OS image in the smart NIC firmware updating process.

FIG. 15 is a sequence diagram of a process for one block of the OS image 216 in the firmware updating process in the smart NIC 20. The sequence illustrated in FIG. 15 is performed for each of the blocks of the OS image 216.

First, the front-end module 130 of the storage controller 10 stages the blocks from the SSD 101 to the DRAM 104 (S151). The front-end module 130 requests the smart NIC 20 to transfer the blocks stored in the DRAM 104 (S152).

The front-end module 230 of the smart NIC 20 uses DMA transfer to move the blocks stored in the DRAM 104 of the storage controller 10 to the DRAM 204 (S153, S154).

The front-end module 230 reads out the blocks from the DRAM 204 (S155), and performs signature verification (S156) and decompression/writing (S157) on those blocks in parallel. The front-end module 230 requests the controller 501 of the built-in memory to write the decompressed OS image (S158).

The controller 501 stores the decompressed blocks in the OS image sub-region in the storage area 502 of the built-in memory (S159). The controller 501 returns a response to the front-end module 230 after data is written (S160). The front-end module 230 notifies the storage controller 10 of a success/failure of the process of the block (S161).

Figure 16:
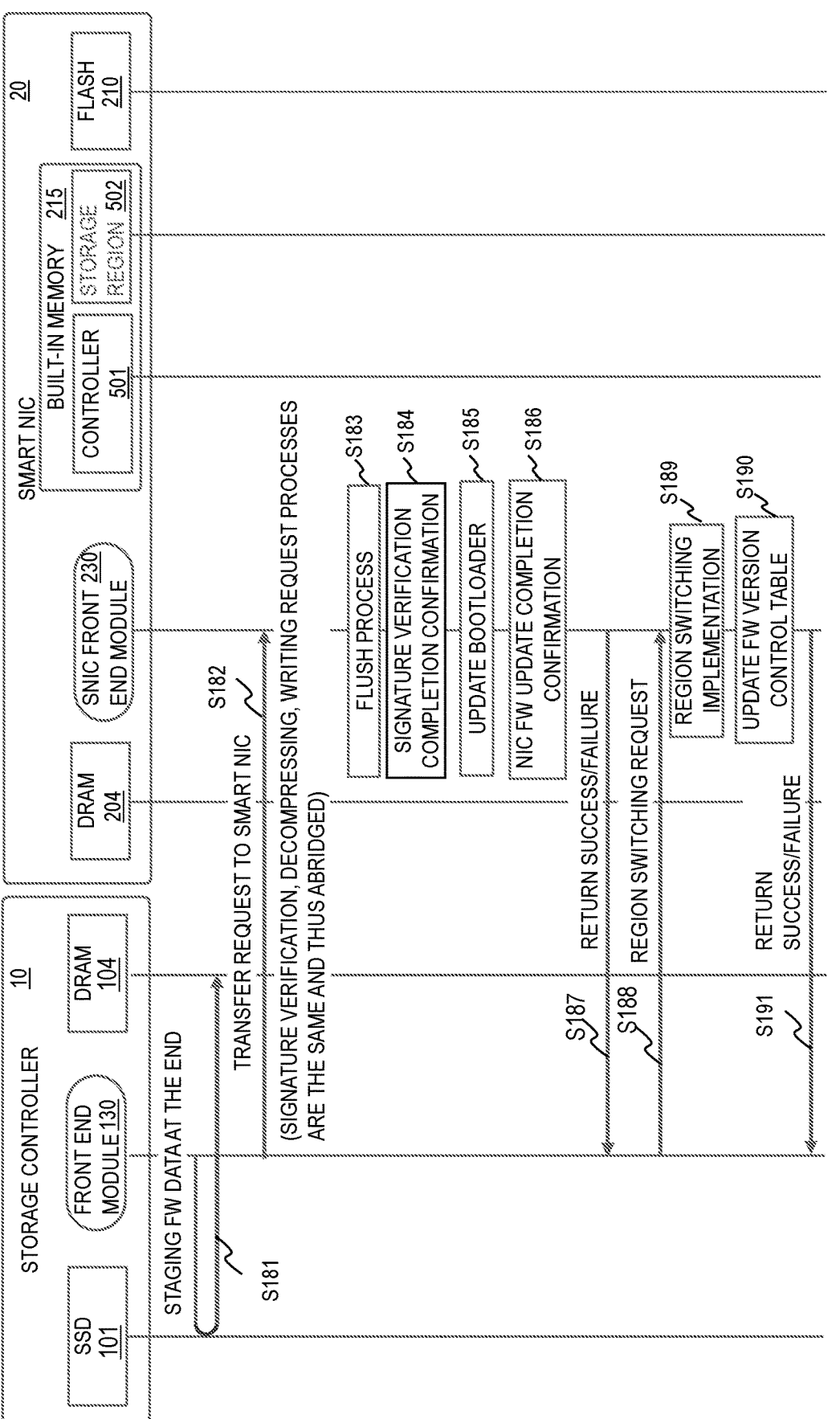
FIG. 16 is a sequence diagram of a termination process and region switching process of the smart NIC firmware.

Next, a termination process and region switching process of the firmware will be explained. FIG. 16 is a sequence diagram of a termination process and region switching process of the firmware in the smart NIC 20. The front-end module 130 of the storage controller 10 stages the last block in the SSD 101 to the DRAM 104 (S181).

The front-end module 130 requests the smart NIC 20 to transfer the block stored in the DRAM 104 (S182). Then, signature verification and decompression/writing are performed as explained with reference to FIG. 15.

Next, the front-end module 230 of the smart NIC 20 performs a flush process on the data stored in the built-in memory 215 (S183) to ensure data is written to the built-in memory 215. Next, the front-end module 230 refers to the signature verification results of all of blocks, and confirms that signature verification is completed for the entire compressed data (S184).

If the signature verification is completed, that means that the system can operate with the firmware stored in the sub-region of the built-in memory 215. Thus, the front-end module 230 updates the bootloader 217 (boot program) stored in the built-in memory 215 (S185). Lastly, the front-end module 230 updates the CHB FW update state control table 205, to indicate the smart NIC 20 can now accept region switching.

The storage controller 10 receives a response from the smart NIC 20 regarding a success/failure of firmware update (S187). If the update was successful, the storage controller 10 requests the smart NIC 20 to switch regions (S188).

The front-end module 230 of the smart NIC 20 performs region switching in the built-in memory 215 and the flash memory 210 (S189), and updates the FW version control table 206 (S190). The front-end module 230 notifies the storage controller 10 of a success/failure of the region switching (S191).

What is claimed is:

1. An information processing device, comprising:
a controller; and
an interface device,
wherein the controller:
stores a compressed file including new firmware for the interface device; and
sends at least part of the compressed data in the compressed file to the interface device,
wherein the interface device performs a signature verification process and a decompressing process on the received compressed data in parallel,
wherein the controller sends a plurality of blocks constituting the compressed file sequentially, and
wherein the interface device performs the signature verification process and a decompressing process on each block in parallel.

2. The information processing device according to claim 1, wherein the interface device includes a non-volatile memory,
wherein the non-volatile memory includes a first region to store currently active firmware, and a second region that differs from the first region, and
wherein the interface device:
writes data obtained by decompressing the compressed data to the second region; and switches from the first region to the second region so that firmware for use is read from the second region, after the firmware for update has been entirely written to the second regions.

3. The information processing device according to claim 1, wherein the interface device:

includes a non-volatile memory and a volatile memory;

stores a block received from the controller in the volatile memory; and performs the signature verification process and the decompressing process in parallel on the block stored in the volatile memory, and stores the decompressed block in the non-volatile memory.

4. The information processing device according to claim 1, wherein the controller determines whether it is necessary to update firmware of the interface device, based on a version of the current firmware of the interface device as compared to a version of the new firmware, and settings of an update forced implementation mode.

5. The information processing device according to claim 1, further comprising a plurality of interface devices, wherein the controller transmits a common block to the plurality of interface devices in parallel.

6. A network device, comprising:

a processor;

a first memory; and a second memory, wherein the processor:

receives, from another device, compressed data including at least part of a new firmware for the network device and stores the compressed data in the first memory; and performs a signature verification process and a decompressing process on the compressed data in parallel, and stores decompressed data in the second memory, wherein the processor receives partial blocks of compressed file of the new firmware in sequence, and performs a signature verification process and a decompressing process on each partial block in parallel.

7. A method for updating network device firmware, comprising the steps of:

receiving, by a network device, from another device, compressed data including at least part of a new firmware for the network device and stores the compressed data in the first memory; and performing, by the network device, a signature verification process and a decompressing process on the compressed data in parallel, and stores decompressed data in the second memory, wherein the network device receives partial blocks of compressed file of the new firmware in sequence, and performs a signature verification process and a decompressing process on each partial block in parallel.

\* \* \* \* \*